(12) United States Patent
Futaba et al.

(10) Patent No.: US 11,078,590 B2
(45) Date of Patent: Aug. 3, 2021

(54) PLATED STEEL

(71) Applicant: NIPPON STEEL CORPORATION, Tokyo (JP)

(72) Inventors: Takashi Futaba, Tokyo (JP); Kiyokazu Ishizuka, Tokyo (JP); Fumio Shibao, Tokyo (JP); Ikuo Kikuchi, Tokyo (JP); Hidetoshi Shindo, Tokyo (JP); Hiroaki Uramoto, Tokyo (JP); Keita Katsumaru, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/620,599

(22) PCT Filed: Jun. 15, 2018

(86) PCT No.: PCT/JP2018/022962
§ 371 (c)(1),
(2) Date: Dec. 9, 2019

(87) PCT Pub. No.: WO2018/230716
PCT Pub. Date: Dec. 20, 2018

(65) Prior Publication Data
US 2020/0141019 A1    May 7, 2020

(30) Foreign Application Priority Data

Jun. 16, 2017 (JP) .............................. JP2017-118795

(51) Int. Cl.
*B32B 15/01* (2006.01)
*B32B 15/08* (2006.01)
(Continued)

(52) U.S. Cl.
CPC .............. *C25D 5/48* (2013.01); *B32B 15/013* (2013.01); *B32B 15/04* (2013.01); *B32B 15/043* (2013.01); *B32B 15/08* (2013.01); *B32B 15/18* (2013.01); *C23C 28/02* (2013.01); *C23C 28/023* (2013.01); *C23C 28/025* (2013.01); *C23C 30/00* (2013.01); *C23C 30/005* (2013.01); *C25D 3/22* (2013.01); *C25D 3/565* (2013.01); *C25D 5/36* (2013.01); *Y10T 428/12361* (2015.01); *Y10T 428/12396* (2015.01); *Y10T 428/12451* (2015.01); *Y10T 428/12472* (2015.01); *Y10T 428/12556* (2015.01); *Y10T 428/12569* (2015.01); *Y10T 428/12799* (2015.01); *Y10T 428/12951* (2015.01); *Y10T 428/12972* (2015.01); *Y10T 428/12979* (2015.01); *Y10T 428/12993* (2015.01); *Y10T 428/2495* (2015.01); *Y10T 428/24967* (2015.01); *Y10T 428/26* (2015.01); *Y10T 428/263* (2015.01); *Y10T 428/264* (2015.01); *Y10T 428/265* (2015.01); *Y10T 428/27* (2015.01); *Y10T 428/273* (2015.01)

(58) Field of Classification Search
CPC . C25D 3/22; C25D 3/565; C25D 5/48; C25D 5/36; B32B 15/08; B32B 15/013; B32B 15/04; B32B 15/043; B32B 15/18; C23C 28/02; C23C 28/023; C23C 28/025; C23C 30/00; C23C 30/005; Y10T 428/12472; Y10T 428/12451; Y10T 428/12556; Y10T 428/12569; Y10T 428/12799; Y10T 428/12951; Y10T 428/12972; Y10T 428/12979; Y10T 428/12993; Y10T 428/2495; Y10T 428/24967; Y10T 428/12396; Y10T 428/12361; Y10T 428/263; Y10T 428/264; Y10T 428/265; Y10T 428/26; Y10T 428/27; Y10T 428/273

See application file for complete search history.

(56) References Cited

U.S. PATENT DOCUMENTS 4,298,661 A    11/1981  Ikeno et al.
6,562,474 B1    5/2003  Yoshimi et al.
(Continued)

FOREIGN PATENT DOCUMENTS

EP        2623636 A1    8/2013
JP    2006-124824 A    5/2006
(Continued)

OTHER PUBLICATIONS

"Cold-rolled stainless steel plate, sheet and strip", JIS G 4305, 2012, total 187 pages.
"Methods of salt spray testing", JIS Z 2371, 2000, total 86 pages.
"Surface Roughness", JIS B 0601, 2001, total 1 page.
"Surface Texture Measurement of Cold Rolled Sheet Steel", SAE J911, Jun. 1986, total 3 pages.
(Continued)

*Primary Examiner* — Michael E. La Villa
(74) *Attorney, Agent, or Firm* — Birch, Stewart, Kolasch & Birch, LLP

(57) ABSTRACT

A plated steel includes: a steel; a zinc based electroplated layer formed on a surface of the steel; and an organic resin coating layer formed on a surface of the zinc based electroplated layer, in which the surface of the zinc based electroplated layer has hairline extending in a predetermined direction, Ra (ML) measured on the surface of the zinc based electroplated layer is 0.10 to 0.70 μm, on the surface of the zinc based electroplated layer, a peak number PPI measured in a hairline orthogonal direction with a reference level of 10 μinch satisfies PPI≥350×Ra (MC) with respect to Ra (MC), on a surface of the organic resin coating layer, Ra (CC) satisfies Ra (CC)/Ra (CL)≥1.10 with respect to Ra (CL), and Ra (CC) satisfies Ra (CC)<Ra (MC) with respect to Ra (MC).

17 Claims, No Drawings

(51) Int. Cl.

| | |
|---|---|
| *C22C 28/00* | (2006.01) |
| *C25D 5/48* | (2006.01) |
| *C25D 3/22* | (2006.01) |
| *C25D 3/56* | (2006.01) |
| *C25D 5/36* | (2006.01) |
| *C23C 28/02* | (2006.01) |
| *B32B 15/04* | (2006.01) |
| *B32B 15/18* | (2006.01) |
| *C23C 30/00* | (2006.01) |

(56) References Cited

U.S. PATENT DOCUMENTS

| | | | |
|---|---|---|---|
| 2004/0018376 A1* | 1/2004 | Hamahara | C23C 28/3455 |
| | | | 428/659 |
| 2011/0027611 A1 | 2/2011 | Takahashi et al. | |
| 2013/0273389 A1* | 10/2013 | Kaneko | C09D 5/084 |
| | | | 428/626 |
| 2018/0100244 A1 | 4/2018 | Shibao et al. | |

FOREIGN PATENT DOCUMENTS

| | | |
|---|---|---|
| JP | 4067222 B2 | 3/2008 |
| JP | 2010-247399 A | 11/2010 |
| JP | 2013-536901 A | 9/2013 |
| JP | 3192959 U | 9/2014 |
| KR | 10-2012-0050732 A | 5/2012 |
| WO | WO 00/28109 A1 | 5/2000 |
| WO | WO 2009/101707 A1 | 8/2009 |
| WO | WO 2012/030726 A1 | 3/2012 |
| WO | WO 2012/043864 A1 | 4/2012 |
| WO | WO 2013/161621 A1 | 10/2013 |
| WO | WO 2016/199652 A1 | 12/2016 |

OTHER PUBLICATIONS

International Search Report for PCT/JP2018/022962 dated Aug. 28, 2018.
Written Opinion of the International Searching Authority for PCT/JP2018/022962 (PCT/ISA/237) dated Aug. 28, 2018.

\* cited by examiner

PLATED STEEL

TECHNICAL FIELD OF THE INVENTION

The present invention relates to a plated steel.

Priority is claimed on Japanese Patent Application No. 2017-118795, filed on Jun. 16, 2017, the content of which is incorporated herein by reference.

RELATED ART

Articles that are visible to people, such as electrical devices, building materials, and vehicles, are generally required to have designability. As a method of improving the designability, a method of applying a coating or attaching a film to the surface of an article is generally used. However, in recent years, the application of materials utilizing metal texture has increased, mainly in Europe and the United States oriented toward nature. From the viewpoint of utilizing the metal texture, a coating and a resin coating impair the metal texture, so that stainless steels and aluminum materials having excellent corrosion resistance even without being coated are used as materials of articles. Even in a case of using such stainless steels or aluminum materials, designability is required. In general, stainless steels and aluminum materials are improved in designability by surface processing such as imparting fine arcuate convex-concave portions called vibration, performing embossing, imparting fine linear convex-concave portions called hairline, or the like. In particular, the external appearance provided with hairline is preferable and widely used.

Hairline finish (HL finish) is defined in JIS G 4305:2012 as "Finish by polishing with an abrasive having an appropriate particle size so as to provide continuous polished texture" as one of the surface finishes of stainless steels.

However, stainless steels and aluminum materials are expensive materials. Therefore, inexpensive materials that replace these stainless steels and aluminum materials are desired. As one of such alternative materials, there is a steel in which hairline is provided on a plated steel and a resin layer is formed thereon.

As a technique for imparting appropriate corrosion resistance to a steel, a technique for imparting zinc plating or zinc alloy plating excellent in sacrificial protection to a steel has been widely used. There has been proposed a steel in which the designability is enhanced by imparting hairline to such zinc plating or zinc alloy plating (hereinafter, zinc plating and zinc alloy plating are collectively referred to as "zinc-based plating").

For example, Patent Document 1 proposes a technique for forming an adhesive layer having a light-transmitting property and a film layer having a light-transmitting property on the surface of a plated layer having a surface roughness Ra (arithmetic average roughness) of 0.1 to 1.0 μm in a direction perpendicular to hairline. Patent Document 2 proposes a technique in which roughness parameters (Ra and PPI) in a hairline direction formed on the surface layer of a Zn—Al—Mg-based hot-dipped layer and in the direction orthogonal to the hairline are set to specific ranges and a transparent resin film layer is formed on the surface of the Zn—Al—Mg-based hot-dipped layer. Patent Document 3 proposes a technique of performing an organic coating on a steel sheet in which a pattern is transferred to Zn plating and Zn-based alloy plating by rolling so as to cause the surface roughness to be in a predetermined range.

PRIOR ART DOCUMENT

Patent Document

[Patent Document 1] Japanese Utility Model Application No. 3192959

[Patent Document 2] Japanese Unexamined Patent Application, First Publication No. 2006-124824

[Patent Document 3] Published Japanese Translation No. 2013-536901 of the PCT International Publication

DISCLOSURE OF THE INVENTION

Problems to be Solved by the Invention

In the techniques of coating an organic resin to a steel sheet to which hairline is imparted as proposed in Patent Documents 1 to 3, an improvement in the designability by the hairline can be realized, and predetermined corrosion resistance can be exhibited. However, due to the presence of the resin coating, there is a problem that the metallic texture (metallic glossiness) is lost.

Since a stainless steel has good corrosion resistance due to an oxide film present on the surface, coating or the like for improving the corrosion resistance is unnecessary. That is, since the metal itself can be used as the surface, the problem of loss of a metallic texture due to a resin coating does not exist in the first place. In a case of applying a resin coating to a stainless steel, an object of the application is to impart coloring or another texture. Therefore, regarding the stainless steel, the loss of a metallic texture as found by the present inventors did not become a problem. The same applies to aluminum materials.

The present invention has been made in view of the above problems. An object of the present invention is to provide a plated steel having hairline appearance while using an inexpensive steel and having an excellent metallic texture and high designability. It is preferable that the plated steel having excellent designability is also excellent in corrosion resistance (long-term corrosion resistance).

Means for Solving the Problem

Although zinc-based plating is excellent in sacrificial protection, zinc-based plating alone is insufficient for securing fingerprint resistance, workability, and corrosion resistance. Therefore, a resin coating is essential in a case where a zinc-plated steel is used as a substitute for stainless steels and aluminum materials. However, as described above, the metallic texture is lost by the resin coating.

In order to solve the above-described problems, the present inventors intensively conducted examinations on a plated steel coated with a resin. As a result, it was found that in a case where the glossiness G60 (Gl) measured in a hairline direction is 70 to 400, and the glossiness G60 (Gc) measured in a hairline orthogonal direction satisfies 0.30≤Gc/Gl≤0.70, an excellent metallic texture can be felt, and the metallic texture is lost when the Gc/Gl is outside the range. That is, the present inventors succeeded in quantifying, for the first time, a feeling that a person feels "having a hairline appearance and being excellent in metallic texture". The glossiness G60 (Gl) is preferably more than 85, and more preferably 100 or more.

The present inventors examined the phenomenon as described above in more detail. As a result, it was found that the reason that a person feels that the metallic texture has been lost as described above is that the difference between the impression of the texture of a metal base seen through a resin and the impression of light reflected on the surface of the resin is large. Specifically, light is reflected on the surface of the resin due to the difference in refractive index from the atmosphere even if the resin is transparent, so the impression of the texture of the metal base seen through the resin and the impression of the light reflected on the surface of the resin have a difference. It is considered that when the difference becomes large, the presence of the resin is strongly recognized, and the impression of the texture of the metal base is reduced, and the metallic texture is lost.

Based on the above findings, the present inventors had considered that the difference between the impression of the texture of a metal base and the impression of light reflected on the surface of a resin surface is suppressed by controlling the shape of the surface of the resin in addition to the shape of the coated surface to be in a predetermined range and thus the glossiness can be controlled to be in a predetermined range, and completed the present invention.

The summary of the present invention completed based on such findings is as follows.

[1] According to an aspect of the present invention, a plated steel includes a steel; a zinc based electroplated layer formed on a surface of the steel; and an organic resin coating layer formed on a surface of the zinc based electroplated layer, in which the surface of the zinc based electroplated layer has hairline extending in a predetermined direction; on the surface of the zinc based electroplated layer, a surface roughness Ra (ML) measured in an extension direction of the hairline is 0.10 to 0.70 μm; on the surface of the zinc based electroplated layer, a peak number PPI measured in a direction orthogonal to the extension direction with a reference level of 10 μinch satisfies a relationship expressed by Formula (I) with respect to a surface roughness Ra (MC) measured in the direction orthogonal to the extension direction; on a surface of the organic resin coating layer, a surface roughness Ra (CC) measured in the direction orthogonal to the extension direction satisfies a relationship expressed by Formula (II) with respect to a surface roughness Ra (CL) measured in the extension direction, and the surface roughness Ra (CC) satisfies a relationship expressed by Formula (III) with respect to the surface roughness Ra (MC).

$$PPI \geq 350 \times Ra(MC) \quad (I)$$

$$Ra(CC)/Ra(CL) \geq 1.10 \quad (II)$$

$$Ra(CC) < Ra(MC) \quad (III)$$

[2] In the plated steel according to [1], an average thickness of the organic resin coating layer may be 10 μm or less.

[3] In the plated steel according to claim [1] or [2], a minimum value of a thickness of the organic resin coating layer may be 0.1 μm or more, and an average thickness of the organic resin coating layer may be 1.0 μm or more.

[4] In the plated steel according to any one of [1] to [3], the surface roughness Ra (MC) may be 1.00 μm or less.

[5] In the plated steel according to any one of [1] to [4], a substrate exposure ratio of the zinc based electroplated layer may be less than 5%.

[6] In the plated steel according to any one of [1] to [5], a coating weight of the zinc based electroplated layer may be 10 g/m² or more.

[7] In the plated steel according to any one of [1] to [6], a surface roughness Ra of the steel after removing the organic resin coating layer and the zinc based electroplated layer may be 0.50 μm or less.

Effects of the Invention

As described above, according to the above aspect of the present invention, it is possible to provide a plated steel having hairline appearance while using an inexpensive steel and having an excellent metallic texture.

EMBODIMENTS OF THE INVENTION

Hereinafter, a preferred embodiment of the present invention will be described in detail.

The embodiment described below does not limit the present invention. In addition, the constituent elements of the embodiment include those that can be easily replaced by those skilled in the art or those that are substantially the same. Furthermore, various forms included in the following embodiment can be arbitrarily combined within the scope obvious to those skilled in the art.

A plated steel according to an embodiment of the present invention (plated steel according to the present embodiment) described below in detail is a zinc-plated steel coated with an organic resin and relates to a plated steel having hairline appearance, an excellent metallic texture, and high designability.

(Plated Steel)

Hereinafter, the plated steels according to the present embodiment will be described in detail.

The plated steel according to the present embodiment includes a zinc based electroplated layer located on the surface of a predetermined steel, and an organic resin coating layer located on the surface side of the zinc based electroplated layer, and the surface of the zinc based electroplated layer has hairline extending in a predetermined direction.

In other words, the plated steel according to the present embodiment includes the steel, the zinc based electroplated layer formed on the surface of the steel, and the organic resin coating layer formed on the surface of the zinc based electroplated layer, and the surface of the zinc based electroplated layer has the hairline extending in the predetermined direction.

In the following description, a "direction in which the hairline extends" is abbreviated as a "hairline direction", and a "direction orthogonal to the extension direction of the hairline" is abbreviated as a "hairline orthogonal direction".

<Steel>

The substrate of the plated steel according to the present embodiment is not particularly limited, and various known steels can be appropriately used depending on the mechanical strength (for example, tensile strength) required for the plated steel and the like.

<Zinc Based Electroplated Layer>

The organic resin coating layer and the zinc based electroplated layer are formed on the surface of the steel as described above, and the hairline is formed on the surface of the zinc based electroplated layer along the predetermined direction.

[Kind and Composition of Zinc Based Electroplated Layer]

The zinc based electroplated layer of the plated steel according to the present embodiment is formed by electrolytic zinc plating or electrolytic zinc alloy plating (hereinafter, collectively referred to as "zinc-based electroplating").

Regarding the plating metal, plating other than zinc-based plating is inferior in sacrificial protection, is thus not suitable for use where a cut end surface is unavoidably exposed in use.

When the concentration of zinc in a zinc-plated layer is too low, the sacrificial protection ability decreases. Therefore, in the case of Zn alloy plating, it is preferable that the alloy plating contain 65 mass % or more of zinc with respect to the total mass of the plating.

Moreover, as a plating method of zinc-based plating, in addition to electroplating, a hot-dipping method, a thermal spraying method, a vapor deposition plating method, and the like are present. However, the hot-dipping method is not suitable because the external appearance quality is inferior due to solidification patterns such as spangles and dross which is unavoidably incorporated in the plated layer. In addition, the thermal spraying method is not suitable because the external appearance evenness cannot be secured due to voids inside the plating. In addition, the vapor deposition method is not suitable because the deposition rate is low and the productivity is poor. Accordingly, in the plated steel according to the present embodiment, electroplating is used to apply zinc-based plating to the surface of the steel.

The electrolytic zinc alloy plating according to the present embodiment includes one or more elements selected from the element group consisting of Co, Cr, Cu, Fe, Ni, P, Sn, Mn, Mo, V, W, and Zr, Zn, and impurities. Moreover, the electrolytic zinc plating contains Zn and impurities. Here, the impurities are not intentionally added as zinc-based electroplating components, but are incorporated in the raw material or incorporated in a manufacturing step. Examples thereof include Al, Mg, Si, Ti, B, S, N, C, Nb, Pb, Cd, Ca, Pb, Y, La, Ce, Sr, Sb, O, F, Cl, Zr, Ag, and W. In the case of the electrolytic zinc plating, although depending on the kind of electroplated steel manufactured by the same manufacturing facility, Co, Cr, Cu, Fe, Ni, P, Sn, Mn, Mo, V, W, Zr, Pb, and the like may be incorporated as impurities. In the present embodiment, even if impurities are present in an amount of about 1.0 mass % or less in total with respect to the mass of the entire plating, the effect obtained by the plating is not impaired.

In the zinc based electroplated layer of the present embodiment, when the Zn content is excessively reduced, the sacrificial protection ability is reduced. Therefore, the Zn content is preferably 65% or more as described above, more preferably 70% or more, and particularly preferably 80% or more, with respect to the total mass of the plating.

The composition of the zinc based electroplated layer as described above can be analyzed, for example, by the following method. That is, after removing the organic resin coating layer with a release agent such as a solvent or remover (for example, NEOREVER S-701: manufactured by SANSAIKAKO) that does not dissolve the plated layer, the zinc based electroplated layer is dissolved with hydrochloric acid containing an inhibitor and can be analyzed by inductively coupled plasma (ICP) emission spectrometer.

[Surface Shape of Zinc Based Electroplated Layer]

The surface of the zinc based electroplated layer according to the present embodiment is provided with the hairline. The surface roughness Ra (ML) on the surface of the zinc based electroplated layer measured in the hairline direction is 0.10 to 0.70 μm. The surface roughness Ra (MC) measured in the hairline orthogonal direction is preferably 1.00 μm or less.

In addition, on the surface of the zinc based electroplated layer, the peak number (peaks per inch (PPI)) measured in the hairline orthogonal direction with a reference level of 10 μinch satisfies the relationship expressed by Formula (I) with respect to the surface roughness Ra (MC) [unit: μm] measured in the hairline orthogonal direction.

$$PPI \geq 350 \times Ra(MC) \tag{I}$$

Here, Ra is the arithmetic average roughness defined in JIS B 0601, and PPI is the number of peaks (peak number) per 1 inch counted from the average line of the extraction curve defined in SAE J911-1986 using the reference level as the threshold. In addition, as described above, Ra (ML) is Ra of the surface of the zinc based electroplated layer measured in the direction parallel to the hairline, and Ra (MC) is Ra of the surface of the zinc based electroplated layer measured in the direction orthogonal to the hairline.

In a case where Ra (ML) exceeds 0.70 μm, the light scattering on the surface of the zinc based electroplated layer is too intense and the glossiness G60 (G1) measured in the hairline direction after coating with the resin becomes less than 70, resulting in the loss of a metallic texture. Therefore, in the present embodiment, the upper limit of Ra (ML) is set to 0.70 μm. On the other hand, in order to provide the hairline to a visible degree, a roughness of 0.10 μm or more is also required in the hairline direction. Therefore, in the present embodiment, the lower limit of Ra (ML) is set to 0.10 μm. In the present embodiment, a more preferable range of Ra (ML) is 0.10 μm to 0.50 μm.

When Ra (MC) exceeds 1.00 μm, Ra in the L direction (direction parallel to the rolling direction and providing hairline) of the steel sheet is particularly large and there is a high possibility that the base may be exposed in a case where the plated layer is thin, which is not preferable. More specifically, in a case where Ra of the steel sheet is 1.00 μm or more and the plating thickness is 5.5 μm or less, the possibility of the base being exposed increases, which is not preferable.

In a case where PPI measured in the hairline orthogonal direction with a reference level of 10 μinch does not satisfy Formula (I) with respect to Ra (MC), the density of the hairline becomes too small. In this case, the relationship of 0.30≤Gc/Gl≤0.70 is not satisfied, and as a result, the metallic texture is reduced and the designability becomes poor. PPI measured in the hairline orthogonal direction with a reference level of 10 μinch, more preferably, satisfies the relationship expressed by Formula (I)'.

$$PPI \geq 450 \times Ra(MC) \tag{I'}$$

Each Ra is the average value of Ra of six points obtained by excluding two maximum points and two minimum points from ten arbitrary points measured on the surface of the zinc based electroplated layer in the predetermined direction (the hairline direction or the hairline orthogonal direction).

The surface roughness Ra in each direction and PPI with a reference level of 10 μinch can all be measured with a stylus type roughness meter. In order to measure the surface roughness of the zinc based electroplated layer after forming the organic resin coating layer, which will be described later, the measurement may be performed after removing the organic resin coating layer with a release agent such as a solvent or remover that does not dissolve the plating. In the measurement, the measurement length of PPI may be 1 inch, the evaluation length of Ra may be five times the reference length (cutoff wavelength), and the measurement speed may be 0.5 mm/sec.

[Substrate Exposure Ratio]

It is preferable that the substrate exposure ratio of the zinc based electroplated layer according to the present embodiment is less than 5%. In the present embodiment, the corrosion resistance is sufficiently secured by zinc plating or zinc alloy plating. However, in a case where the substrate is exposed when the hairline is imparted, the long-term corrosion resistance (long-term corrosion resistance) may be further reduced due to the effect of galvanic corrosion. Such deterioration of long-term corrosion resistance becomes significant at a substrate exposure ratio of 5% or more in many cases. Therefore, it is preferable that the substrate exposure ratio is less than 5%.

In the present embodiment, by causing the substrate exposure ratio of the zinc based electroplated layer to be less than 5%, very good corrosion resistance such as excellent long-term corrosion resistance in addition to moderate corrosion resistance generally required for steels can be provided. The substrate exposure ratio of the zinc based electroplated layer is more preferably 3% or less, and even more preferably 0%.

The substrate exposure ratio can be obtained by removing the organic resin coating layer with a release agent such as a solvent or remover that does not dissolve the plating, performing EPMA analysis on five arbitrary 1-mm squares, and performing image analysis on the ratio of areas where Zn is not detected to the analysis area. In the present embodiment, a region where the detection intensity of Zn is $\frac{1}{16}$ or less of that in a case where a standard sample (pure Zn) is measured is determined as a region where Zn is not detected.

[Coating Weight of Zinc Based Electroplated Layer]

It is preferable that the coating weight of the zinc based electroplated layer according to the present embodiment 10 g/m² or more. From the viewpoint of corrosion resistance, the coating weight of the zinc based electroplated layer is not limited as long as desired corrosion resistance can be secured. However, in a case where the coating weight of the zinc based electroplated layer is less than 10 g/m², the possibility of the substrate exposure ratio exceeding 5% while the hairline is imparted increases. The coating weight of the zinc based electroplated layer is more preferably 15 g/m² or more, and even more preferably 20 g/m² or more. The upper limit value of the coating weight of the zinc based electroplated layer may be appropriately determined in view of the manufacturing cost and the like of the plated steel according to the present embodiment, and may be, for example, about 40 g/m². The upper limit value of the coating weight is preferably 35 g/m².

Hereinabove, the zinc based electroplated layer provided in the plated steel according to the present embodiment has been described in detail.

Subsequently, in the plated steel according to the present embodiment, the organic resin coating layer formed on the surface of the zinc based electroplated layer (the side opposite to the steel) will be described.

<Organic Resin Coating Layer>

The surface of the zinc based electroplated layer to which the hairline as described above is imparted is coated with a transparent organic resin (in other words, an organic resin having a light-transmitting property). The "organic resin having a light-transmitting property" means that when the organic resin is formed on the surface of the plated layer, the plated layer can be visually observed through the organic resin coating layer.

[Composition of Organic Resin Coating Layer]

The resin used to form the organic resin coating layer is not particularly limited as long as the resin sufficiently has its light-transmitting property. For example, an epoxy resin, a urethane resin, a polyester resin, a phenol resin, a polyether sulfone resin, a melamine alkyd resin, an acrylic resin, a polyamide resin, a polyimide resin, a silicone resin, a polyvinyl acetate resin, a polyolefin resin, a polystyrene resin, a vinyl chloride resin, and a vinyl acetate resin can be used.

At this time, in order to improve the adhesion to metal (that is, the zinc based electroplated layer located under the organic resin coating layer), silanol groups or the like may be introduced into the above-mentioned various resins. Moreover, when the organic resin coating layer is formed, the above-mentioned various resins may be used independently, and a mixture of these resins may also be used. The organic resin coating layer may have a single layer structure of the above-mentioned various resins, or may have a laminated structure of the above-mentioned various resins.

Furthermore, in order to improve the adhesion between the organic resin coating layer and the zinc based electroplated layer, an inorganic treatment, an organic-inorganic composite treatment, a surface reforming treatment, or the like may be performed on the plated steel including the steel and the zinc based electroplated layer within a range that does not impair the external appearance. Here, "impairing the external appearance" means to reduce the metallic texture, such as decreasing the transparency, causing uneven gloss, or producing an abnormal uneven texture. Examples of such treatment include a Zr oxide treatment, a Zn oxide treatment, a silane coupling agent treatment, a weak acid immersion treatment, and a weak alkali immersion treatment.

In order to add desired performance to the organic resin coating layer, various additives may be contained within a range that does not impair the transparency and external appearance and does not deviate from the range specified in the present invention. Examples of the performance to be added to the organic resin coating layer include corrosion resistance, sliding ability, scratch resistance, conductivity, and color tone. For example, for corrosion resistance, an antirust agent, an inhibitor, or the like may be contained, for sliding ability or scratch resistance, wax, beads, or the like may be contained, for conductivity, a conductive agent or the like may be contained, and for color tone, a pigment, a dye, or the like may be contained.

[Surface Shape of Organic Resin Coating Layer]

The organic resin coating layer according to the present embodiment has a surface shape as described in detail below due to the hairline formed on the surface of the zinc based electroplated layer as the lower layer.

That is, on the surface of the organic resin coating layer according to the present embodiment, in a case of focusing on the hairline direction and the hairline orthogonal direction in the zinc based electroplated layer, the surface roughness Ra (CC) [unit: μm] measured in the hairline orthogonal direction satisfies the relationship expressed by Formula (II) with respect to the surface roughness Ra (CL) [unit: μm] measured in the hairline direction, and satisfies the relationship expressed by Formula (III) with respect to the surface roughness Ra (MC) which is the surface roughness Ra on the surface of the zinc based electroplated layer measured in the hairline orthogonal direction.

$$Ra(CC)/Ra(CL) \geq 1.10 \quad \text{(II)}$$

$$Ra(CC) < Ra(MC) \quad \text{(III)}$$

In a case where the surface roughness Ra (CC) of the organic resin coating layer is less than 1.10 times the surface roughness Ra (CL), the gap between the impression received from the texture of the hairline and the impression of light reflection on the surface of the organic resin coating layer becomes too large. As a result, the metallic texture is lost and the designability is poor. The surface roughness Ra (CC) of the organic resin coating layer is more preferably 1.20 or more times the surface roughness Ra (CL) (Ra (CC)/Ra (CL)≥1.20).

On the other hand, in a case where beads or the like are contained in the organic resin coating layer in order to impart lubricity, or in a case where Ra (CC)≥Ra (MC) is satisfied by forming a pear skin external appearance, as described above, the gap between the impression received from the texture of the hairline and the impression of light reflection on the surface of the organic resin coating layer becomes too large. As a result, the metallic texture is lost and the designability is poor. Therefore, it is necessary to satisfy Formula (III).

The surface roughness Ra of the organic resin coating layer in each direction can be measured by a stylus type roughness meter. Each of the surface roughness Ra (CL) and the surface roughness Ra (MC) is the average value of Ra of six points obtained by, as in the surface roughness Ra (ML) and the surface roughness Ra (MC) in the zinc based electroplated layer, measuring ten arbitrary points and excluding two maximum points and two minimum points.

[Thickness of Organic Resin Coating Layer]

It is preferable that the average thickness of the organic resin coating layer according to the present embodiment is 10 μm or less. When the average thickness of the organic resin coating layer exceeds 10 μm, even if the organic resin coating layer is formed by adjusting the viscosity and plating method, and even if the zinc based electroplated layer is provided with hairline, the surface of the organic resin coating layer is easily smoothed. Furthermore, as the distance light travels in the organic resin coating layer increases, the reflected light decrease in intensity, and the possibility that the glossiness may decrease increases. Furthermore, due to the deformation of the resin caused by working, a deviation between the texture of the surface of the zinc based electroplated layer and the shape of the surface of the organic resin coating layer is likely to occur. From the above reasons, the average thickness of the organic resin coating layer is preferably 10 μm or less, and more preferably 8 μm or less.

On the other hand, from the viewpoint of long-term corrosion resistance, the thickness of the thinnest part of the organic resin coating layer when viewed from a cross section (that is, the minimum value of the thickness of the organic resin coating layer) is 0.1 μm or more, and the average thickness of the organic resin coating layer is preferably 1.0 μm or more. Here, the "thinnest part" means the minimum value of the film thickness measured at 20 points with an interval of 100 μm in a cross-sectional sample cut into a length of 5 mm at an arbitrary position in the direction orthogonal to the hairline, and the "average thickness" means the average of 20 points. The thickness of the thinnest part of the organic resin coating layer is more preferably 0.5 μm or more, and the average thickness of the organic resin coating layer is more preferably 3.0 μm or more.

Hereinabove, the organic resin coating layer according to the present embodiment has been described in detail.

In the plated steel according to the present embodiment, it is preferable that the surface roughness after removing the organic resin coating layer and the zinc based electroplated layer (that is, the surface roughness of the steel) is 0.5 μm or less in terms of Ra. Here, the surface roughness after removing the organic resin coating layer and the zinc based electroplated layer is a value measured in the direction parallel to the hairline. In a case where the surface roughness after removing the organic resin coating layer and the zinc based electroplated layer is too large, there are cases where it is difficult to cause the plating surface roughness Ra (ML) measured in the hairline direction to be 0.10 to 0.70 μm. In addition, in a case where the surface roughness after removing the organic resin coating layer and the zinc based electroplated layer is too large, the possibility that the peak parts of convex-concave portions may be cut off when hairline is imparted increases, so that the possibility of the substrate exposure ratio exceeding 5% increases.

When the surface roughness of the steel is measured, the organic resin coating layer and the zinc based electroplated layer may be removed by being immersed in dilute hydrochloric acid to which an inhibitor is added so as not to dissolve the steel. The concentration of hydrochloric acid may be set to, for example, 10 mass %.

Whether or not the substrate is exposed is affected not only by the surface roughness Ra of the steel (substrate) which becomes the substrate, but also by various factors such as the thickness of the zinc based electroplated layer and the depth of the hairline. However, it is considered that the effects of the surface roughness Ra of the steel and the thickness of the zinc based electroplated layer are relatively large. Therefore, in the present embodiment, the preferable surface roughness Ra of the steel is defined as described above.

As described above, in the plated steel according to the present embodiment, in the steel provided with the transparent organic resin coating layer and the zinc based electroplated layer, the shape of the surface of the organic resin coating layer in addition to the shape of the surface of the zinc based electroplated layer surface is controlled to be in a predetermined range. Accordingly, the difference between the impression of the texture of the metal base and the impression of the light reflected on the surface of the resin can be suppressed, so that the glossiness G60 (Gl) measured in the hairline direction can be 70 to 400 and can be controlled to be in a range of 0.30≤Gc/Gl≤0.70 with respect to the glossiness G60 (Gc) measured in the hairline orthogonal direction, whereby the metallic texture can be exhibited. Accordingly, a material excellent in metallic texture having a certain corrosion resistance while using an inexpensive steel and having an excellent metallic texture with hairline appearance can be obtained.

The above glossinesses G60 (Gl) and G60 (Gc) can be measured by using a commercially available gloss meter.

Hereinabove, the plated steel according to the present embodiment has been described in detail.

(Method of Manufacturing Plated Steel)

Subsequently, a method of manufacturing the plated steel according to the present embodiment as described above will be described.

In the method of manufacturing the plated steel according to the present embodiment, first, a steel (for example, a cold-rolled steel sheet) with a surface roughness adjusted as necessary is subjected to degreasing with an alkaline solution and pickling with an acid using hydrochloric acid, sulfuric acid, or the like, whereafter a zinc based electroplated layer is formed. Here, a known method can be used to adjust the surface roughness of the steel. For example, when a sheet material is used as the steel, a method performing rolling and transferring with a roll adjusted to have a desired surface roughness range can be used.

As a method of forming the zinc based electroplated layer, a known electroplating method can be used. As an electroplating bath, for example, a sulfuric acid bath, a chloride bath, a zincate bath, a cyanide bath, a pyrophosphoric acid bath, a boric acid bath, a citric acid bath, other complex baths, and combinations thereof can be used. In an electrolytic zinc alloy plating bath, by adding single ions or complex ions of one or more selected from Co, Cr, Cu, Fe, Ni, P, Sn, Mn, Mo, V, W, and Zr in addition to Zn ions, an electrolytic zinc alloy-plated layer containing Co, Cr, Cu, Fe, Ni, P, Sn, Mn, Mo, V, W, and Zr in desired amounts can be formed. Furthermore, it is further preferable to add an additive to the plating bath in order to control the stabilization of ions in the plating bath and the characteristics of the plating.

The composition, temperature, and flow rate of the electroplating bath, the current density and current pattern at the time of plating, and the like may be appropriately selected so as to obtain a desired plating composition. Moreover, control of the thicknesses of a zinc-plated layer and an electrolytic zinc alloy-plated layer can be performed by adjusting a current value and time within a current density range in which a desired composition is achieved.

Hairline is formed on the plated steel provided with the obtained zinc based electroplated layer. Examples of a method of imparting hairline include, as in the case of imparting hairline to a stainless steel, a method of performing polishing with a polishing belt and a method of performing polishing with an abrasive brush.

A method of performing transferring using a roll to which pattern is imparted is not preferable because there is concern that convex-concave portions of plating crystals may not be removed sufficiently and the glossiness may be reduced.

The depth and frequency of the hairline can be controlled to the shape according to the present embodiment by adjusting the particle size of the polishing belt or the abrasive brush.

The surface of the zinc based electroplated layer to which the hairline is imparted as described above is coated with an organic resin. Here, a paint used to form the organic resin coating layer preferably follows the surface shape of the steel at the moment of application to the steel, and is preferably slowly leveled after reflecting the surface shape of the steel once. That is, it is desirable that the paint has a low viscosity at a high shear rate and a high viscosity at a low shear rate. Specifically, it is desirable that the paint has a viscosity of 10 [Pa·s] or more at a shear rate of 0.1 [1/sec], and a shear viscosity of 0.01 [Pa·s] or less at a shear rate of 1000 [1/sec].

In order to adjust the shear viscosity to the above range, for example, an aqueous emulsion paint can be adjusted by adding a hydrogen-bondable viscosity modifier. Such a hydrogen-bondable viscosity modifier can be bound by hydrogen bonds at a low shear rate and thus can increase the viscosity of the paint. However, at a high shear rate, the hydrogen bonds are broken, and the viscosity decreases. Accordingly, adjustment to the shear viscosity according to the required coating conditions becomes possible. In a case of using a solvent-based paint, adjustment can be performed by, for example, adding a transparent pigment such as $SiO_2$, $TiO_2$, or ZnO, or mixing resins having different thermophysical properties. At this time, in the case adding a pigment, it is desirable to use a resin having a refractive index close to that of the pigment, and in the case of mixing resins having different thermophysical properties, it is desirable that the refractive indexes of both resins are close. When the difference in refractive index is large, scattering occurs at the interface between the resin and the pigment or at the interface between different resins, so that the texture of the surface of the electroplated layer is blurred and the metallic texture is lost. The difference in refractive index is preferably 20% or less, and more preferably 10% or less.

By controlling the shear viscosity of the paint used to form the organic resin coating layer as described above, it is possible to realize the surface shape of the organic resin coating layer as described above. Here, in a case where the paint used to form the organic resin coating layer does not have the above-mentioned shear viscosity, the surface roughness of the organic resin coating layer with respect to the convex-concave portions (that is, the hairline shape) of the zinc based electroplated layer is excessively smoothed, and it becomes difficult to realize the surface shape of the organic resin coating layer as described above.

A method of coating the organic resin is not particularly limited, and a known method can be used. For example, the organic resin can be formed by performing application using the paint adjusted to the viscosity as described above with a spraying method, a roll coater method, a curtain coater method, or a dip pulling method, and thereafter subjecting the paint to natural drying or baking drying. The drying temperature and drying time, and the baking temperature and baking time may be appropriately determined so that the organic resin coating layer to be formed has the desired performance and the shape according to the present embodiment. At this time, when the temperature rising rate is slow, the time from the softening point of the resin component to the completion of baking becomes long and leveling proceeds, therefore, it is preferable that the temperature rising rate is fast.

EXAMPLES

Hereinafter, the effects of the present invention will be specifically described by way of invention examples. The contents of the present invention are not limited by the contents described in the following examples.

An annealed and temper-rolled steel sheet having a thickness of 0.6 mm (a steel sheet containing, as a composition by mass %, C: 0.001%, Si: 0.01%, Mn: 0.1%, P: 0.008%, S: 0.004%, and a remainder consisting of Fe and impurities) was subjected to electrolytic degreasing using a $Na_4SiO_4$ treatment solution with a concentration of 30 g/L under the conditions of a treatment solution of 60° C., a current density of 20 A/dm$^2$, and a treatment time of 10 seconds, and was washed with water. Next, the electrolytically degreased steel was immersed in an aqueous $H_2SO_4$ solution having a concentration of 50 g/L at 60° C. for 10 seconds, and was further washed with water, whereby a plating pretreatment was performed thereon. Ra (arithmetic average roughness) of the steel sheet in an L direction (direction parallel to the rolling direction and providing the hairline) was each as shown in Tables 1A and 2A below.

Next, the steel as described above was subjected to plating as shown in Tables 1A and 2A below to form a zinc based electroplated layer.

A Zn plating (Table 1A: Nos. 1 to 15) was formed using a plating bath at pH 2.0 containing 1.0 mol/l of Zn sulfate heptahydrate and 50 g/L of anhydrous sodium sulfate by adjusting the plating time so that the coating weight became about 11 g/m$^2$ (Nos. 5, 8, and 12), 22 g/m$^2$ (Nos. 1 to 4, 7, 9 to 11, 14 to 15), 30 g/m$^2$ (No. 13), and 38 g/m$^2$ (No. 6) at a bath temperature of 50° C. and a current density of 50 A/dm$^2$.

A Zn—Ni plating (Table 1A: Nos. 16 to 30) was formed, when plating was performed at a bath temperature of 50° C. and a current density of 50 A/dm$^2$, using a plating bath at pH 2.0 containing a total of 1.2 mol/l of Zn sulfate heptahydrate and Ni sulfate hexahydrate, Zn sulfate heptahydrate and Ni sulfate hexahydrate being adjusted in a ratio such that the composition in Table 1A below was obtained, and 50 g/L of anhydrous sodium sulfate by adjusting the plating time so that the coating weight became about 11 g/m² (No. 26), 22 g/m² (Nos. 16 to 23, 25, 27, 29, and 30), 30 g/m² (No. 28), and 38 g/m² (No. 24).

A Zn—Fe plating (Tables 1A to 2A: Nos. 31 to 45) was formed, when plating was performed at a bath temperature of 50° C. and a current density of 50 A/dm², using a plating bath at pH 2.0 containing a total of 1.2 mol/l of Zn sulfate heptahydrate and Fe(II) sulfate heptahydrate, Zn sulfate heptahydrate and Fe(II) sulfate heptahydrate being adjusted in a ratio such that the composition in Tables 1A and 2A below was obtained, and 50 g/L of anhydrous sodium sulfate by adjusting the plating time so that the coating weight became about 11 g/m² (Nos. 35 and 38), 22 g/m² (Nos. 31 to 34, 36 to 37, 40 to 42, and 44 to 45), 30 g/m² (No. 43), and 38 g/m² (No. 39).

A Zn—Co plating (Table 2A: Nos. 46 to 60) was formed, when plating was performed at a bath temperature of 50° C. and a current density of 50 A/dm², using a plating bath at pH 2.0 containing a total of 1.2 mol/l of Zn sulfate heptahydrate and Co sulfate heptahydrate, Zn sulfate heptahydrate and Co sulfate heptahydrate being adjusted in a ratio such that the composition in Table 2A below was obtained, and 50 g/L of anhydrous sodium sulfate by adjusting the plating time so that the coating weight became about 22 g/m² (Nos. 46 to 52, and 54 to 60) and 38 g/m² (No. 53).

A Zn—Ni—Fe plating (Table 2A: Nos. 61 and 62) was formed, when plating was performed at a bath temperature of 50° C. and a current density of 50 A/dm², using a plating bath at pH 2.0 containing a total of 1.2 mol/l of Zn sulfate heptahydrate, Ni sulfate hexahydrate, and Fe(II) sulfate heptahydrate, Zn sulfate heptahydrate, Ni sulfate hexahydrate, and Fe(II) sulfate heptahydrate being adjusted in a ratio such that the composition in Table 2A below was obtained, and 50 g/L of anhydrous sodium sulfate by adjusting the plating time so that the coating weight became about 11 g/m² (No. 61) and 22 g/m² (No. 62).

A Zn—Co—Mo plating (Table 2A: Nos. 63 and 64) was formed, when plating was performed at a bath temperature of 50° C. and a current density of 50 A/dm², using a plating bath at pH 4.0 containing a total of 1.2 mol/l of Zn sulfate heptahydrate, Co sulfate heptahydrate, and sodium molybdate dihydrate, Zn sulfate heptahydrate, Co sulfate heptahydrate, and sodium molybdate dihydrate being adjusted in a ratio such that the composition in Table 2A below was obtained, 25 g/L of sodium formate, and 50 g/L of boric acid by adjusting the plating time so that the coating weight became about 22 g/m².

In all the plating treatments described above, the plating solution was allowed to flow such that the relative flow velocity was 1 m/sec. Moreover, the composition of the obtained plating was confirmed by immersing the plated steel sheet in 10 mass % hydrochloric acid containing an inhibitor (No. 700AS manufactured by ASAHI Chemical Co., Ltd.) to cause the plated steel sheet to be dissolved and peel, and analyzing the dissolved solution by ICP.

In addition, as the above reagents, general reagents were used.

For Nos. 1 to 64, hairline was imparted to the obtained plated steel sheet along the L direction (rolling direction) of the steel sheet. The hairline was formed by pressing abrasive paper of various particle sizes against the steel sheet and changing the rolling force and the number of times of polishing.

The plating roughness and coating weight after the hairline was imparted are as shown in Tables 1A and 2A below.

The plating roughness (that is, surface roughness Ra) was measured with a three-dimensional surface roughness measuring machine (SURFCOM 1500DX3 manufactured by Tokyo Seimitsu Co., Ltd.). The coating weight was calculated from the difference in weight before and after dissolution and peeling by immersion in 10 mass % hydrochloric acid containing an inhibitor (No. 700AS manufactured by ASAHI Chemical Co., Ltd.).

The coating weight shown in Tables 1A and 2A below is coating weight measured after the hairline was imparted, and the difference from the above coating weight corresponds to the decrease in the plating in the process of imparting the hairline.

The substrate exposure ratio was measured by cutting the obtained plated steel sheet, analyzing five 1-mm square visual fields with EPMA (JXA8230 manufactured by JEOL, Ltd), and calculating the ratio of the area where Zn was not detected by image analysis and Fe was detected. EPMA analysis was performed under the conditions of an acceleration voltage of 15 kV and an irradiation current of 30 nA. A region where the detection intensity of Zn was $1/16$ or less of that in a case where a standard sample (pure Zn) was measured was determined as a region where Zn was not detected, and a region where the detection intensity of Fe was more than $14/16$ of that in a case where a standard sample (pure Fe) was measured was determined as a region where Fe was detected.

The obtained results are shown in Tables 1A and 2A below.

A transparent organic resin coating layer was formed on the above-described plated steel sheet to which the hairline was applied. As a transparent organic resin, treatment solutions having various concentrations and viscosities, in which a urethane resin (HUX-232 manufactured by ADEKA Corporation) is dispersed in water, were prepared, and these treatment solutions were drawn up with a roller, and transferred so as to achieve the thickness shown in Tables 1A and 2A below after being baked and dried. The steel sheet to which the treatment solution was transferred was placed in a furnace maintained at 250° C., held for one minute to five minutes until the attainment temperature of the steel sheet reached 210° C., and then taken out and cooled.

Here, various sizes of polyethylene wax were added to Nos. 3 to 5, Nos. 11 to 15, Nos. 18 to 20, Nos. 26 to 30, Nos. 33 to 35, Nos. 41 to 45, Nos. 48 to 50, and Nos. 56 to 64.

Acrylic beads (GR400 transparent manufactured by Negami Chemical Industrial Co., Ltd.) with an average particle size of 1.5 times the thickness of the organic resin coating layer were added to Nos. 4, 19, 34, and 49 in a ratio of 3 mass % to the solid content of the paint.

When the above treatment solution was prepared, the treatment solution was adjusted using BYK-425 (manufactured by BYK Additives & Instruments) as a viscosity modifier to have a viscosity of 10 [Pa·s] or more at a shear rate of 0.1 [1/sec] and a viscosity of 0.01 [Pa·s] or less at a shear rate of 1000 [1/sec]. The viscosity modifier was not added only to the treatment solution corresponding to No. 33, and the viscosity at a shear rate of 0.1 [1/sec] was adjusted to be less than 10 [Pa·s].

The surface roughness of the organic resin coating layer was measured by the same method as the surface roughness of the zinc based electroplated layer. In addition, the glossinesses G60 (G1) and G60 (Gc) of the obtained plated steels were each measured by a gloss meter (manufactured by Suga Test Instruments Co., Ltd.: Gloss Meter UGV-6P). The obtained results are summarized in Tables 1A, 1B, 2A and 2B below.

Regarding the corrosion resistance (more specifically, long-term corrosion resistance) of the obtained plated steel, the obtained sample was cut into a size of 75 mm×100 mm, the end surface and the rear surface were protected with a tape seal, and the sample was provided for a 35° C.-5% NaCl salt spray test (JIS Z 2371). A rust generation ratio of 5% or less after 240 hours was evaluated as OK and a rust generation ratio of more than 5% was evaluated as NG. The obtained results are shown in Tables 1B and 2B below.

TABLE 1A

| | Steel | Zinc based electroplated layer | | | | | Organic resin coating layer | | | |
| | Surface | | Surface roughness | | | coating | Substrate | | | Resin coating layer thickness |
| No. | roughness Ra (μm) | Kind of Plating | Ra (ML) (μm) | Ra (MC) (μm) | PPI/Ra (MC) | weight (g/m²) | exposure ratio (%) | Ra(CC)/ Ra(CL) | Ra(CC)/ Ra(MC) | Average (μm) | Minimum (μm) |
|---|---|---|---|---|---|---|---|---|---|---|---|
| 1 | 0.22 | Zn | 0.51 | 0.56 | 296 | 20.8 | 0 | 1.13 | 0.30 | 10 | 9.0 |
| 2 | 1.22 | Zn | 1.13 | 1.15 | 452 | 20.6 | 0 | 1.38 | 0.16 | 10 | 8.2 |
| 3 | 0.22 | Zn | 0.35 | 0.39 | 846 | 15.3 | 10 | 0.89 | 0.21 | 13 | 12.3 |
| 4 | 0.22 | Zn | 0.42 | 0.51 | 731 | 19.8 | 0 | 0.98 | 1.22 | 10 | 9.4 |
| 5 | 0.22 | Zn | 0.33 | 1.83 | 328 | 8.1 | 35 | 1.80 | 0.27 | 3 | 0.03 |
| 6 | 1.22 | Zn | 0.56 | 1.13 | 433 | 35.3 | 20 | 1.33 | 0.64 | 3 | 0.2 |
| 7 | 0.22 | Zn | 0.29 | 0.33 | 879 | 19.6 | 0 | 1.28 | 0.70 | 0.5 | 0.2 |
| 8 | 0.74 | Zn | 0.68 | 0.72 | 588 | 9.3 | 6 | 1.17 | 0.29 | 10 | 7.8 |
| 9 | 0.22 | Zn | 0.36 | 0.47 | 951 | 20.3 | 0 | 1.10 | 0.23 | 10 | 8.9 |
| 10 | 0.22 | Zn | 0.25 | 0.34 | 1524 | 20.2 | 1 | 1.45 | 0.94 | 10 | 8.6 |
| 11 | 0.22 | Zn | 0.38 | 0.46 | 354 | 19.8 | 0 | 1.13 | 0.39 | 10 | 9.2 |
| 12 | 0.22 | Zn | 0.19 | 0.23 | 665 | 9.8 | 4 | 1.15 | 0.65 | 10 | 8.7 |
| 13 | 0.22 | Zn | 0.23 | 0.31 | 860 | 27.2 | 0 | 1.33 | 0.39 | 7 | 5.4 |
| 14 | 0.22 | Zn | 0.29 | 0.58 | 972 | 18.3 | 2 | 1.18 | 0.22 | 5 | 3.8 |
| 15 | 0.22 | Zn | 0.39 | 0.47 | 930 | 19.8 | 0 | 1.36 | 0.32 | 3 | 1.9 |
| 16 | 0.22 | Zn—12% Ni | 0.21 | 0.25 | 1108 | 15.6 | 20 | 1.07 | 0.64 | 13 | 12.2 |
| 17 | 1.22 | Zn—12% Ni | 1.01 | 0.94 | 365 | 20.3 | 0 | 1.00 | 0.23 | 10 | 9.8 |
| 18 | 0.22 | Zn—12% Ni | 0.53 | 0.62 | 516 | 19.2 | 0 | 1.09 | 0.19 | 13 | 11.8 |
| 19 | 0.22 | Zn—12% Ni | 0.53 | 0.62 | 806 | 19.2 | 0 | 1.13 | 1.50 | 10 | 6.9 |
| 20 | 0.22 | Zn—12% Ni | 0.23 | 0.24 | 263 | 13.8 | 30 | 1.15 | 0.63 | 10 | 8.3 |
| 21 | 0.22 | Zn—12% Ni | 0.23 | 0.24 | 675 | 19.6 | 0 | 1.14 | 0.45 | 0.5 | 0.3 |
| 22 | 0.74 | Zn—12% Ni | 0.66 | 0.78 | 388 | 19.5 | 0 | 1.32 | 0.37 | 7 | 4.7 |
| 23 | 0.22 | Zn—12% Ni | 0.18 | 0.22 | 682 | 13.3 | 8 | 1.10 | 0.50 | 10 | 9.1 |
| 24 | 1.22 | Zn—12% Ni | 0.63 | 1.22 | 633 | 32.9 | 15 | 1.21 | 0.68 | 3 | 1.1 |
| 25 | 0.22 | Zn—12% Ni | 0.18 | 0.26 | 577 | 13.6 | 0 | 1.14 | 0.96 | 10 | 7.7 |
| 26 | 0.22 | Zn—12% Ni | 0.24 | 0.27 | 393 | 8.9 | 3 | 1.22 | 0.41 | 10 | 8.4 |
| 27 | 0.22 | Zn—12% Ni | 0.34 | 0.52 | 396 | 16.4 | 1 | 1.33 | 0.31 | 10 | 7.6 |
| 28 | 0.22 | Zn—10% Ni | 0.43 | 0.50 | 442 | 28.5 | 0 | 1.30 | 0.26 | 7 | 5.5 |
| 29 | 0.22 | Zn—8% Ni | 0.21 | 0.32 | 1008 | 18.4 | 0 | 1.40 | 0.44 | 5 | 3.4 |
| 30 | 0.22 | Zn—5% Ni | 0.25 | 0.42 | 822 | 18.2 | 0 | 1.38 | 0.26 | 3 | 2.2 |
| 31 | 0.22 | Zn—15% Fe | 0.60 | 0.61 | 337 | 20.0 | 0 | 1.33 | 0.26 | 10 | 9.1 |

TABLE 1B

| | Evaluation result | | | | |
|---|---|---|---|---|---|
| No. | Gl | Gc | Gc/Gl | Corrosion resistance (long-term corrosion resistance) | Note |
| 1 | 85 | 77 | 0.91 | OK | Comparative Example |
| 2 | 43 | 29 | 0.67 | OK | Comparative Example |
| 3 | 92 | 90 | 0.98 | NG | Comparative Example |
| 4 | 62 | 63 | 1.02 | OK | Comparative Example |
| 5 | 240 | 66 | 0.28 | NG | Comparative Example |
| 6 | 216 | 71 | 0.33 | NG | Example |
| 7 | 224 | 141 | 0.63 | OK | Example |
| 8 | 72 | 46 | 0.64 | NG | Example |
| 9 | 98 | 68 | 0.69 | OK | Example |
| 10 | 72 | 48 | 0.67 | OK | Example |
| 11 | 108 | 73 | 0.68 | OK | Example |
| 12 | 132 | 81 | 0.61 | NG | Example |
| 13 | 213 | 130 | 0.61 | OK | Example |
| 14 | 146 | 80 | 0.55 | OK | Example |
| 15 | 156 | 91 | 0.59 | OK | Example |
| 16 | 89 | 79 | 0.89 | NG | Comparative Example |
| 17 | 83 | 67 | 0.81 | OK | Comparative Example |
| 18 | 92 | 86 | 0.93 | OK | Comparative Example |
| 19 | 59 | 48 | 0.81 | OK | Comparative Example |
| 20 | 198 | 168 | 0.85 | NG | Comparative Example |
| 21 | 191 | 108 | 0.57 | OK | Example |
| 22 | 79 | 54 | 0.68 | OK | Example |
| 23 | 102 | 70 | 0.69 | NG | Example |
| 24 | 198 | 73 | 0.37 | NG | Example |
| 25 | 79 | 53 | 0.67 | OK | Example |
| 26 | 90 | 62 | 0.69 | NG | Example |
| 27 | 167 | 109 | 0.65 | OK | Example |
| 28 | 198 | 124 | 0.62 | OK | Example |
| 29 | 192 | 117 | 0.61 | OK | Example |

TABLE 1B-continued

| | | | | Evaluation result | |
|---|---|---|---|---|---|
| No. | Gl | Gc | Gc/Gl | Corrosion resistance (long-term corrosion resistance) | Note |
| 30 | 188 | 110 | 0.59 | OK | Example |
| 31 | 121 | 109 | 0.90 | OK | Comparative Example |

TABLE 2A

| | Steel | Zinc based electroplated layer | | | | | Organic resin coating layer | | | |
|---|---|---|---|---|---|---|---|---|---|---|
| | Surface | | Surface roughness | | coating | Substrate | | | Resin coating layer thickness | |
| No. | roughness Ra (μm) | Kind of Plating | Ra (ML) (μm) | Ra (MC) (μm) | PPI/Ra (MC) | weight (g/m²) | exposure ratio (%) | Ra(CC)/ Ra(CL) | Ra(CC)/ Ra(MC) | Average (μm) | Minimum (μm) |
| 32 | 1.22 | Zn—15% Fe | 0.78 | 0.83 | 506 | 20.1 | 0 | 1.17 | 0.25 | 10 | 9.4 |
| 33 | 0.22 | Zn—15% Fe | 0.48 | 0.61 | 374 | 19.8 | 0 | 1.00 | 0.18 | 13 | 12.3 |
| 34 | 0.22 | Zn—15% Fe | 0.24 | 0.32 | 563 | 18.8 | 0 | 1.21 | 1.09 | 10 | 6.4 |
| 35 | 0.22 | Zn—15% Fe | 0.26 | 1.23 | 309 | 8.1 | 30 | 1.65 | 0.51 | 3 | 1.2 |
| 36 | 0.22 | Zn—15% Fe | 0.17 | 0.19 | 926 | 19.3 | 0 | 1.31 | 0.89 | 0.5 | 0.3 |
| 37 | 0.74 | Zn—15% Fe | 0.66 | 0.73 | 384 | 19.6 | 0 | 1.16 | 0.51 | 10 | 7.8 |
| 38 | 0.22 | Zn—15% Fe | 0.16 | 0.18 | 456 | 9.7 | 2 | 1.13 | 0.75 | 10 | 8.1 |
| 39 | 1.22 | Zn—15% Fe | 0.68 | 1.33 | 433 | 35.6 | 36 | 1.26 | 0.49 | 4 | 0.3 |
| 40 | 0.22 | Zn—15% Fe | 0.19 | 0.23 | 887 | 19.9 | 0 | 1.22 | 0.96 | 10 | 7.6 |
| 41 | 0.22 | Zn—15% Fe | 0.17 | 0.19 | 368 | 20.4 | 0 | 1.13 | 0.89 | 10 | 8.0 |
| 42 | 0.22 | Zn—15% Fe | 0.31 | 0.52 | 556 | 17.8 | 4 | 1.27 | 0.27 | 10 | 6.8 |
| 43 | 0.22 | Zn—12% Fe | 0.29 | 0.36 | 1030 | 28.8 | 0 | 1.56 | 0.39 | 7 | 5.3 |
| 44 | 0.22 | Zn—10% Fe | 0.34 | 0.44 | 970 | 19.9 | 0 | 1.44 | 0.30 | 5 | 3.8 |
| 45 | 0.22 | Zn—6% Fe | 0.27 | 0.48 | 852 | 19.5 | 0 | 1.20 | 0.25 | 3 | 2.2 |
| 46 | 0.22 | Zn—2% Co | 0.54 | 0.58 | 183 | 18.2 | 0 | 1.09 | 0.60 | 10 | 9.3 |
| 47 | 1.22 | Zn—2% Co | 1.13 | 1.16 | 382 | 20.4 | 0 | 1.15 | 0.72 | 10 | 8.7 |
| 48 | 0.22 | Zn—2% Co | 0.34 | 0.42 | 562 | 19.5 | 0 | 1.05 | 0.55 | 13 | 11.8 |
| 49 | 0.22 | Zn—2% Co | 0.29 | 0.38 | 666 | 19.8 | 0 | 1.23 | 1.13 | 10 | 6.9 |
| 50 | 0.22 | Zn—2% Co | 0.31 | 1.33 | 320 | 17.3 | 28 | 1.79 | 0.81 | 7 | 5.8 |
| 51 | 0.22 | Zn—2% Co | 0.26 | 0.31 | 958 | 20.2 | 0 | 1.27 | 0.90 | 0.5 | 0.2 |
| 52 | 0.74 | Zn—2% Co | 0.68 | 0.75 | 387 | 19.9 | 2 | 1.13 | 0.47 | 10 | 8.7 |
| 53 | 1.22 | Zn—2% Co | 0.64 | 1.19 | 399 | 34.8 | 16 | 1.39 | 0.73 | 3 | 0.6 |
| 54 | 0.22 | Zn—2% Co | 0.18 | 0.21 | 905 | 19.4 | 0 | 1.13 | 0.59 | 10 | 8.8 |
| 55 | 0.22 | Zn—2% Co | 0.23 | 0.35 | 543 | 18.6 | 0 | 1.50 | 0.94 | 10 | 8.7 |
| 56 | 0.22 | Zn—2% Co | 0.32 | 0.39 | 359 | 19.8 | 0 | 1.24 | 0.54 | 10 | 8.2 |
| 57 | 0.22 | Zn—2% Co | 0.17 | 0.23 | 878 | 17.9 | 4 | 1.27 | 0.61 | 10 | 7.6 |
| 58 | 0.22 | Zn—0.5% Co | 0.24 | 0.46 | 1044 | 19.8 | 0 | 1.20 | 0.52 | 7 | 5.3 |
| 59 | 0.22 | Zn—5% Co | 0.54 | 0.71 | 351 | 19.9 | 0 | 1.25 | 0.14 | 5 | 3.5 |
| 60 | 0.22 | Zn—9% Co | 0.55 | 0.71 | 419 | 19.9 | 0 | 1.18 | 0.18 | 3 | 2.1 |
| 61 | 0.22 | Zn—10% Ni—2% Fe | 0.24 | 0.27 | 393 | 8.9 | 3 | 1.22 | 0.41 | 9 | 7.9 |
| 62 | 0.22 | Zn—10% Ni—2% Fe | 0.65 | 0.66 | 400 | 19.9 | 0 | 1.18 | 0.20 | 9 | 8.3 |
| 63 | 0.22 | Zn—2% Co—0.5% Mo | 0.33 | 0.42 | 644 | 19.3 | 0 | 1.38 | 0.25 | 7 | 7.4 |
| 64 | 0.22 | Zn—2% Co—0.5% Mo | 0.46 | 0.50 | 442 | 18.9 | 1 | 1.30 | 0.26 | 9 | 8.1 |

TABLE 2B

| | | | | Evaluation result | |
|---|---|---|---|---|---|
| No. | Gl | Gc | Gc/Gl | Corrosion resistance (long-term corrosion resistance) | Note |
| 32 | 63 | 47 | 0.75 | OK | Comparative Example |
| 33 | 81 | 80 | 0.99 | OK | Comparative Example |
| 34 | 53 | 55 | 1.04 | OK | Comparative Example |
| 35 | 203 | 51 | 0.25 | NG | Comparative Example |
| 36 | 228 | 153 | 0.67 | OK | Example |
| 37 | 74 | 48 | 0.65 | OK | Example |
| 38 | 133 | 92 | 0.69 | NG | Example |
| 39 | 138 | 56 | 0.41 | NG | Example |
| 40 | 93 | 63 | 0.68 | OK | Example |
| 41 | 183 | 127 | 0.69 | OK | Example |
| 42 | 166 | 95 | 0.57 | OK | Example |
| 43 | 171 | 108 | 0.63 | OK | Example |
| 44 | 148 | 95 | 0.64 | OK | Example |

TABLE 2B-continued

Evaluation result

| No. | Gl | Gc | Gc/Gl | Corrosion resistance (long-term corrosion resistance) | Note |
|---|---|---|---|---|---|
| 45 | 142 | 89 | 0.63 | OK | Example |
| 46 | 73 | 67 | 0.92 | OK | Comparative Example |
| 47 | 58 | 38 | 0.66 | OK | Comparative Example |
| 48 | 122 | 114 | 0.93 | OK | Comparative Example |
| 49 | 65 | 66 | 1.02 | OK | Comparative Example |
| 50 | 174 | 46 | 0.26 | NG | Comparative Example |
| 51 | 169 | 97 | 0.57 | OK | Example |
| 52 | 72 | 48 | 0.67 | OK | Example |
| 53 | 153 | 73 | 0.48 | NG | Example |
| 54 | 126 | 86 | 0.68 | OK | Example |
| 55 | 72 | 50 | 0.69 | OK | Example |
| 56 | 158 | 108 | 0.68 | OK | Example |
| 57 | 172 | 88 | 0.51 | OK | Example |
| 58 | 156 | 91 | 0.58 | OK | Example |
| 59 | 156 | 100 | 0.64 | OK | Example |
| 60 | 151 | 99 | 0.66 | OK | Example |
| 61 | 90 | 62 | 0.69 | NG | Example |
| 62 | 140 | 96 | 0.69 | OK | Example |
| 63 | 183 | 113 | 0.62 | OK | Example |
| 64 | 198 | 124 | 0.62 | OK | Example |

According to Tables 1A, 1B, 2A, and 2B, all of the examples of the present invention were provided with hairline, the glossiness G60 (Gl) measured in the hairline direction, which is an index indicating whether a steel has a metallic texture, was 70 to 400 and was in a range of $0.30 \leq Gc/Gl \leq 0.70$ with respect to the glossiness G60 (Gc) measured in the hairline orthogonal direction. That is, all of the examples corresponding to the plated steel of the present invention had excellent metallic texture.

Contrary to this, in all of the comparative examples, the glossiness G60 (Gl) was less than 70 or was out of the range of $0.30 \leq Gc/Gl \leq 0.70$ with respect to the glossiness G60 (Gc) measured in the hairline orthogonal direction. That is, it became clear that the plated steel according to the comparative example cannot be said to have an excellent metallic texture because the impression of the metal surface and the impression of the light reflected on the resin surface deviated from each other.

While the preferred embodiments of the present invention have been described above in detail, the present invention is not limited to these examples. It is obvious that those skilled in the art to which the present invention belongs can conceive of various changes or modifications within the scope of the technical idea described in the claims, and it is understood that these also fall within the technical scope of the present invention.

INDUSTRIAL APPLICABILITY

According to the present invention, it is possible to provide a plated steel having hairline appearance and having an excellent metallic texture while using an inexpensive steel.

What is claimed is:

1. A plated steel comprising:
   a steel;
   a zinc based electroplated layer formed on a surface of the steel; and
   an organic resin coating layer formed on a surface of the zinc based electroplated layer,
   wherein the surface of the zinc based electroplated layer has hairline extending in a predetermined direction,
   on the surface of the zinc based electroplated layer, a surface roughness Ra (ML) measured in an extension direction of the hairline is 0.10 to 0.70 μm,
   on the surface of the zinc based electroplated layer, a peak number PPI measured in a direction orthogonal to the extension direction with a reference level of 10 μinch satisfies a relationship expressed by Formula (I) with respect to a surface roughness Ra (MC) measured in the direction orthogonal to the extension direction,
   on a surface of the organic resin coating layer, a surface roughness Ra (CC) measured in the direction orthogonal to the extension direction satisfies a relationship expressed by Formula (II) with respect to a surface roughness Ra (CL) measured in the extension direction, and
   the surface roughness Ra (CC) satisfies a relationship expressed by Formula (III) with respect to the surface roughness Ra (MC), $$PPI \geq 350 \times Ra(MC) \tag{I}$$

$$Ra(CC)/Ra(CL) \geq 1.10 \tag{II}$$

$$Ra(CC) < Ra(MC) \tag{III},$$

where, a unit of Ra(MC), Ra(CL) and Ra(CC) is μm.

2. The plated steel according to claim 1, wherein an average thickness of the organic resin coating layer is 10 μm or less.

3. The plated steel according to claim 2,
   wherein a minimum value of a thickness of the organic resin coating layer is 0.1 μm or more, and
   an average thickness of the organic resin coating layer is 1.0 μm or more.

4. The plated steel according to claim 2,
   wherein the surface roughness Ra (MC) is 1.00 μm or less.

5. The plated steel according to claim 2,
   wherein a substrate exposure ratio of the zinc based electroplated layer is less than 5%.

6. The plated steel according to claim 5,
   wherein a minimum value of a thickness of the organic resin coating layer is 0.1 μm or more, and
   an average thickness of the organic resin coating layer is 1.0 μm or more.

7. The plated steel according to claim 6:
   wherein a minimum value of a thickness of the organic resin coating layer is 0.1 μm or more, and an average thickness of the organic resin coating layer is 1.0 μm or more,
   the surface roughness Ra (MC) is 1.00 μm or less,
   a coating weight of the zinc based electroplated layer is 10 g/m² or more, and
   a surface roughness Ra of the steel after removing the organic resin coating layer and the zinc based electroplated layer is 0.50 μm or less, where, the Ra is measured in a L direction.

8. The plated steel according to claim 5,
   wherein the surface roughness Ra (MC) is 1.00 μm or less.

9. The plated steel according to claim 5,
   wherein a coating weight of the zinc based electroplated layer is 10 g/m² or more.

10. The plated steel according to claim 5,
    wherein a surface roughness Ra of the steel after removing the organic resin coating layer and the zinc based electroplated layer is 0.50 μm or less, where, the Ra is measured in a L direction.

11. The plated steel according to claim 2,
wherein a coating weight of the zinc based electroplated layer is 10 g/m² or more.

12. The plated steel according to claim 2,
wherein a surface roughness Ra of the steel after removing the organic resin coating layer and the zinc based electroplated layer is 0.50 μm or less, where, the Ra is measured in a L direction.

13. The plated steel according to claim 1,
wherein a minimum value of a thickness of the organic resin coating layer is 0.1 μm or more, and
an average thickness of the organic resin coating layer is 1.0 μm or more.

14. The plated steel according to claim 1,
wherein the surface roughness Ra (MC) is 1.00 μm or less.

15. The plated steel according to claim 1,
wherein a substrate exposure ratio of the zinc based electroplated layer is less than 5%.

16. The plated steel according to claim 1,
wherein a coating weight of the zinc based electroplated layer is 10 g/m² or more.

17. The plated steel according to claim 1,
wherein a surface roughness Ra of the steel after removing the organic resin coating layer and the zinc based electroplated layer is 0.50 μm or less, where, the Ra is measured in a L direction.

* * * * *